Nov. 25, 1930.   W. B. HUTHER   1,782,507
DADO SAW
Filed Sept. 13, 1927   2 Sheets-Sheet 1
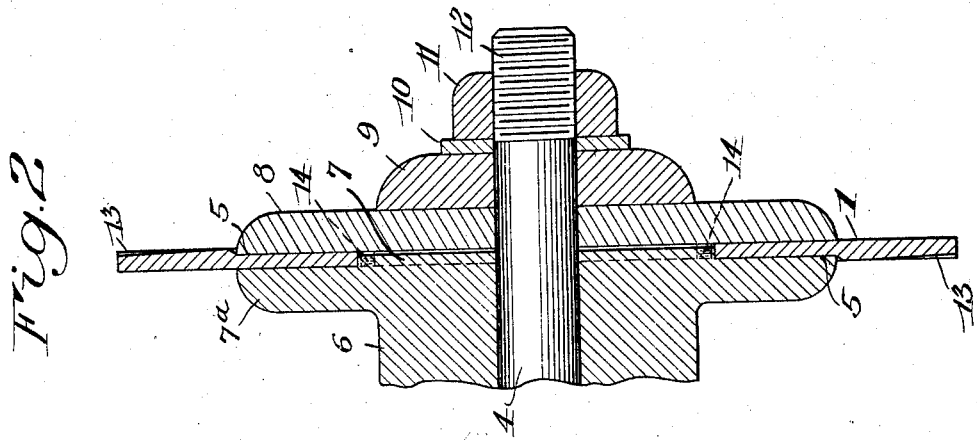
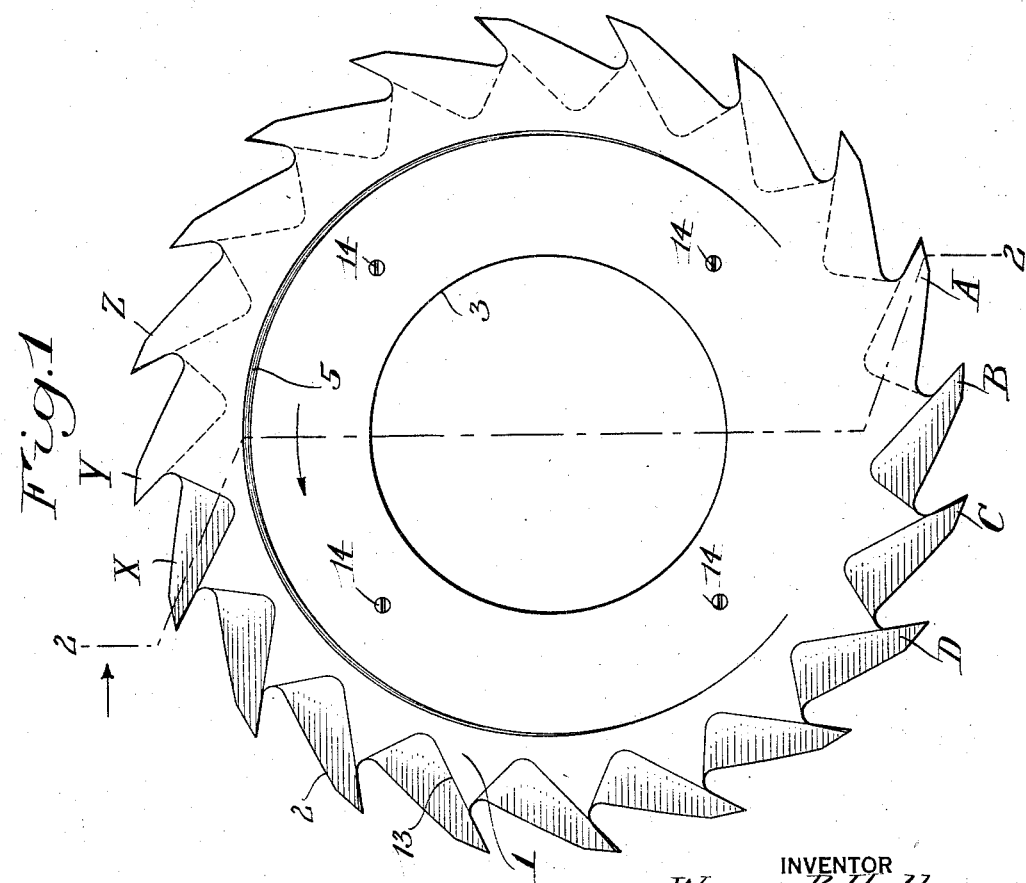
INVENTOR
Warren B. Huther
BY
his ATTORNEYS Nov. 25, 1930. W. B. HUTHER 1,782,507
DADO SAW
Filed Sept. 13, 1927 2 Sheets-Sheet 2
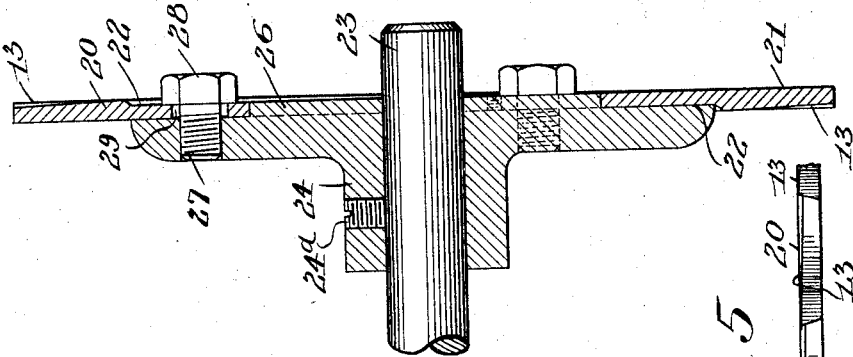
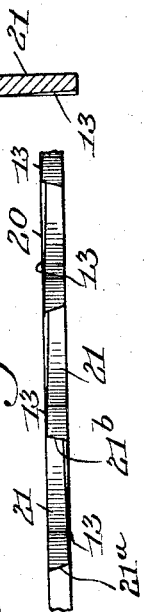
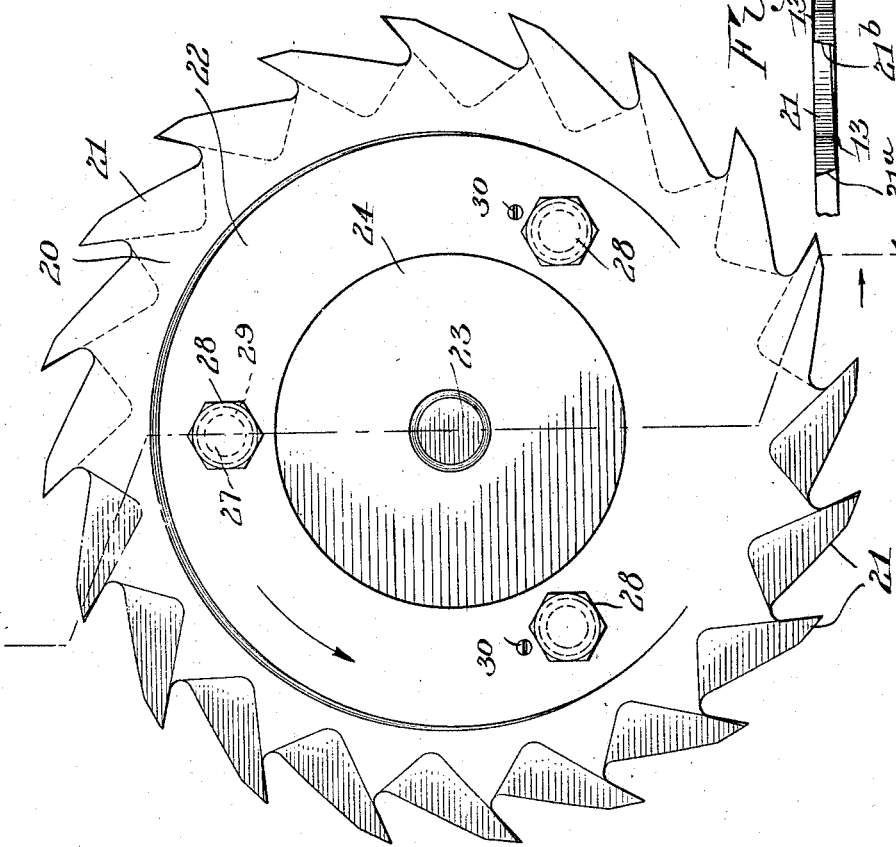
INVENTOR
Warren B. Huther
BY
his ATTORNEYS Patented Nov. 25, 1930

1,782,507

UNITED STATES PATENT OFFICE

WARREN B. HUTHER, OF ROCHESTER, NEW YORK, ASSIGNOR TO HUTHER BROS. SAW MANUFACTURING COMPANY, OF ROCHESTER, NEW YORK, A CORPORATION OF NEW YORK

DADO SAW

Application filed September 13, 1927. Serial No. 219,212.

The present invention relates to so-called dado, wobble or grooving saws, and has for an object the production of a saw of this type which is stronger, more durable and more efficient in operation than the grooving saws heretofore constructed. A further object is to simplify the manufacture of saws of this type. A further object is the provision of a grooving saw having its operating portion lying substantially in a plane and so arranged as to avoid the tendency of the saw to fan the air and throw dust and chips. A further object is to provide a saw capable of being formed to produce the desired wobbling action by grinding.

A still further object is to provide a saw of this type which is readily interchangeable with straight cutting saws by reason of the fact that it requires no special bevelled collars or mandrels to hold it in correct position on its spindle.

Still another object is to provide a dado saw in which it is unnecessary to set the teeth.

To these and other ends the invention resides in certain improvements and combinations of parts, all as will be hereinafter more fully described, the novel features being pointed out in the claims at the end of the specification.

In the drawings:

Fig. 1 is an elevation of a saw embodying my invention;

Fig. 2 is a vertical section taken on line 2—2 of Fig. 1, and showing the saw attached to the spindle;

Fig. 3 is a view similar to Fig. 1 showing a slightly modified form;

Fig. 4 is a vertical section taken on line 4—4 of Fig. 3 with the saw secured in position on its spindle by a modified form of attaching means; and Fig. 5 is a fragmentary detail view of the edge of the saw showing the manner of relieving the teeth.

Similar reference numerals throughout the several views indicate the same parts.

Referring to the drawings, 1 indicates my improved saw having teeth 2 on its periphery and provided with a bearing opening 3 for assembly on the head.

The saw is preferably, but not necessarily, constructed from a relatively thick circular disk and on each face of the disk I form inclined concentric mounting faces herein shown in the form of depressions 5. The deepest portion of the depression on one face of the saw lies opposite to the shallowest portion of the depression on the opposite face of the saw, so that the material included between the depressions is substantially of uniform thickness at all points. In practice the shallowest portion of the depression may substantially coincide with the original face of the disk, the particular place, however, where the plane of the depression intersects the plane of the disk is not important. The depressed portions 5 are preferably formed by a grinding process, the particular manner of grinding the depressions, however, is not material to the present invention.

It will be seen that the mounting portion, which is that part of the saw included between the depressed portions, is substantially of uniform thickness and is inclined to the plane of the outer edge of the disk.

The saw may be secured on a spindle 4 by means of a head 6 fixed on the spindle. The head 6 is provided with a centering member 7 which fits within the bearing opening 3 of the saw. The flange 7ª on the head is of a size to substantially fit within one of the depressed portions 5 of the saw. A collar 8 engages in the opposite depressed portion of the saw from the flange 7ª. An additional collar 9 and washer 10 are placed on the spindle in contact with the collar 8 and all are held in place by a nut 11 secured on the threaded end 12 of the spindle 4.

The head 6 and collar 8, as shown, are the ordinary straight head and collar elements which are used with ordinary straight cutting saws.

It will be noted that the teeth and the periphery of the saw disk lie in substantially a single plane and the mounting portion lies in another plane which is inclined to the plane of the periphery and teeth. Therefore, when the mounting portion is engaged between the straight head and collar members on spindle 4, the plane of the teeth will be inclined away from a right angular relation to said spindle, and when the saw is rotated by the spindle the periphery and teeth will have a wobbling action. It is this arrangement that enables the teeth to cut a groove which is wider than their width.

In order to provide for the proper cutting action of the teeth and to avoid binding of the teeth in the work, each tooth is provided with a relieved or cut-away portion 13, on the side thereof toward which the tooth moves due to its wobbling action as the saw rotates. In practice one half of the number of teeth of the saw are relieved on one side and the remaining half of the teeth are relieved on the opposite side. As shown in Fig. 1, the teeth from B to X going in a clockwise direction around the saw are relieved on the front as illustrated in full lines and the remainder of the teeth are relieved on the back as shown in dotted lines.

An adjusting means may be provided for varying the inclination of the saw with respect to the spindle 4. This adjusting means comprises a plurality of set screws 14, carried in the saw disk, four being shown for purposes of illustration, spaced equally around the center of the saw. When it is desired to change the inclination of the saw to produce a wider groove, the upper set screws 14 as shown in Fig. 2 are turned so as to project farther to the left and the lower set screws 14 are turned so as to project farther to the right.

When the collar 8 is again placed in position after the set screws have been adjusted, it will be seen that the ends of the upper set screws will contact against the collar 7ª and on the lower side of the shaft the collar 7ª will engage in the depressed portion on that side of the saw. The collar 8 will engage the ends of set screws 14 below the spindle 4, and above the spindle the collar 8 will engage in the deepest portion of the depression in that face of the saw.

If it is desired to narrow the groove made by the saw, or even to convert the saw for straight cutting, the set screws 14 will be turned to cause them to project in a direction reverse to that described above. It will be seen that when the screws are thus adjusted, they will project outwardly at the deepest part of the depressed portion on the corresponding faces, so that they will align the saw between flange 7ª and collar 8 to a position more nearly at right angles to the spindle 4.

In the operation of my improved saw, let it be assumed that the saw is rotating in the direction of the arrow in Fig. 1. As the saw wobbles in its rotation the tooth A will make a cut at one extreme side of the groove and tooth X will make a corresponding cut at the other side. The tooth B, following tooth A, will begin to cut back toward the other side of the groove and each following tooth will cut farther toward the same side until tooth Y comes into operation. Tooth Y will start to cut toward the opposite side and each following tooth from Y to A will cut farther over toward this side until B again enters the work.

In the modification illustrated in Figs. 3 and 4, the saw 20 has teeth 21 and depressed portions 22 which are identical respectively with teeth 2 and depressed portions 5 of Figs. 1 and 2. In this form I provide a different means for adjustably mounting the saw 20 with relation to spindle 23 and head 24. The head 24 is secured on spindle 23 by means of a set screw 24ª and is provided with a flange 25 and the centering extension 26 similar to the construction shown in Fig. 1. At spaced points around the centering element the flange 25 has holes 27 therein for the reception of bolts 28. Holes 29 are provided in the depressed central portion of saw 20. These holes register with holes 27, so that the saw may be securely fixed on the head 24 by means of said bolts 28. Two set screws 30 are screwed into the depressed portion 22, one being adjacent each of the lower bolts 28 as seen in Fig. 1. These set screws are adapted to bear against the face of the head 24. By screwing the set screws 30 in the direction of the head it will be seen that the lower edge of the saw, as seen in Fig. 4, will be moved to the right and thus the groove which will be made by the saw 20 will be narrower. By moving the set screws 30 until the plane of the saw teeth is coincident with the plane of the face of the head 24 it is apparent that the saw can then be used for straight cutting.

Fig. 5 shows the relieved sides of the teeth somewhat exaggerated for the sake of clearness. The two teeth at the left in this figure are the last of one series and the next two teeth are the first of the other series. It will be noted that the front edges of successive teeth are reversely inclined as shown at 21ª and 21ᵇ.

It will be observed that my improved saw requires no special inclined heads, washers or the like, so that it will be freely interchangeable with ordinary straight cutting saws.

The practice of forming an inclined surface on a saw by grinding offers several distinct advantages over prior constructions in which the inclined surface is produced by forming up or bending. Where such bending or pressing is resorted to, relatively thin stock must be used since it is impracticable to bend relatively thick stock. The bending can rarely be performed without some distortion of the parts of the saw which should be straight. Also the bending tends to produce a condition of internal stress upon the structure of the metal which in use of the saw, with the attendant heating due to friction, tends to cause warping and deflection from the intended shape.

In my improved saw I am able to produce a heavier and stronger article by reason of the fact that no pressing or bending is necessary and there is no tendency to warp since no internal stresses are produced in its manufacture.

It will be noted further that a saw embodying my improved construction presents no definite radial projections or shoulders and hence is largely freed from the fanning action, or, in other words, the tendency to catch and throw air, dust and chips which is characteristic of saw disks formed up or pressed to provide inclined portions with definite shoulder projections therebetween, or disks of segmental shape, as in some prior constructions.

I claim as my invention:

1. A dado saw comprising a circular disk having a continuous series of peripheral teeth lying in a common plane, said disk having a recessed portion affording a lateral mounting face lying in a plane inclined to the plane of said teeth.

2. A dado saw comprising a disk having its peripheral portion lying in a plane and provided with cutting teeth and having an inner mounting portion of less thickness than said peripheral portion and inclined to the plane thereof.

3. A dado saw comprising a disk having its periphery lying in a plane and provided with cutting teeth and a lateral inner mounting face ground in said disk at an inclination to said peripheral plane.

4. A dado saw comprising a circular disk having a continuous series of peripheral teeth lying in a common plane and means for mounting said disk on a spindle with said plane inclined from a right angle relation to said spindle, said teeth being relieved from front to rear at the sides thereof which are advanced laterally toward the work by said inclined mounting.

5. A dado saw comprising a disk having its peripheral portion lying in a plane and provided with cutting teeth, said disk having a lateral mounting face lying inwardly of the opposite faces of said peripheral portion and inclined thereto.

6. A dado saw comprising a disk having a peripheral portion lying in a plane and provided with cutting teeth and having an intermediate portion recessed on its opposite sides and inclined to the peripheral portion.

7. A dado saw comprising a disk having a peripheral portion lying in a plane, said portion being provided with cutting teeth, said disk having an intermediate portion recessed on its opposite sides and affording substantially parallel mounting faces, each of which is inclined to one face of said peripheral portion.

8. A dado saw comprising a disk having a peripheral portion provided with cutting teeth, said disk having an intermediate portion recessed on its opposite sides and inclined to the peripheral portion, said intermediate portion being of less thickness than said peripheral portion.

9. A dado saw comprising a disk having a peripheral portion lying in a plane and provided with cutting teeth, said disk having a lateral mounting portion lying inwardly of the opposite faces of said peripheral portion and inclined thereto, a spindle for driving said disk having a supporting element therefor engaging one side of said mounting portion, a second supporting element engaging the opposite side of the mounting portion, and a plurality of devices adjustably connected with the disk for varying its inclination relative to the axis of the spindle, certain of said devices being arranged for engagement with one of said elements and the remaining devices with the opposite element when the disk is in a predetermined position of adjustment upon the spindle.

10. A dado saw comprising a disk having a peripheral portion lying in a plane and provided with cutting teeth, said disk having an intermediate mounting portion in a plane inclined to the plane of said peripheral portion, a spindle for driving said saw having a supporting element engaging one side of the mounting portion, a second supporting element clamped upon the other side of said mounting portion and a plurality of set screws threaded within the saw disk and adjustable to vary the inclination of the disk relative to the axis of the spindle, each of said screws being mounted independently of one of said supporting elements.

11. A dado saw comprising a saw disk, supporting elements for the disk engaging opposite faces thereof, means for clamping said elements upon the saw disk, separate and independent devices adjustably connected with the disk for varying the inclination of the latter relative to its axis of rotation, certain of the devices being mounted independently of one of said elements and arranged for engagement with the other and the remaining devices being mounted independently of the last mentioned element and arranged for engagement with the other of said elements.

WARREN B. HUTHER.